(12) United States Patent
Radhakrishnan et al.

(10) Patent No.: US 9,716,435 B2
(45) Date of Patent: Jul. 25, 2017

(54) MINIMUM ON-TIME CONTROL FOR LOW LOAD DC/DC CONVERTER

(71) Applicant: TEXAS INSTRUMENTS INCORPORATED, Dallas, TX (US)

(72) Inventors: Madhan Radhakrishnan, Bangalore (IN); Nitin Agarwal, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 111 days.

(21) Appl. No.: 14/272,063

(22) Filed: May 7, 2014

(65) Prior Publication Data

US 2015/0326102 A1 Nov. 12, 2015

(51) Int. Cl.
*H02M 1/00* (2006.01)
*H02M 1/14* (2006.01)
(Continued)

(52) U.S. Cl.
CPC ........... *H02M 3/1588* (2013.01); *H02M 1/00* (2013.01); *H02M 1/143* (2013.01); *H02M 1/15* (2013.01); *H02M 3/158* (2013.01); *H02M 2001/0003* (2013.01); *H02M 2001/0009* (2013.01); *H02M 2001/0012* (2013.01); *Y02B 70/1466* (2013.01)

(58) Field of Classification Search
CPC ................. H02M 1/083; H02M 3/156; H02M 2005/2935; H02M 3/1588; H02M 2001/0009; H02M 3/158; H02M 1/00; H02M 1/143; H02M 1/15; H02M 2001/0003; H02M 2001/0012; Y02B 70/1466

See application file for complete search history.

(56) References Cited

U.S. PATENT DOCUMENTS 5,912,552 A * 6/1999 Tateishi .............. H02M 3/1588
323/224
9,484,815 B2 * 11/2016 Dally .................... H02M 3/158
(Continued)

*Primary Examiner* — Gustavo Rosario Benitez
(74) *Attorney, Agent, or Firm* — John R. Pessetto; Charles A. Brill; Frank D. Cimino

(57) ABSTRACT

Aspects of the present invention provide a DC/DC converter for use with a supply voltage and operable to drive a load, wherein the DC/DC converter includes a $V_{IN}$ node, a $V_{OUT}$ node, a switching component, a filter, a comparator, a current detecting component and a control component. The $V_{IN}$ node can receive the supply voltage and the $V_{OUT}$ node can provide an output voltage to drive the load. The filter electrically connects the switching component with the $V_{OUT}$ node. The comparator can generate a comparison signal based on the output voltage. The current detecting component can detect when a current in a direction from the filter toward the $V_{OUT}$ node decreases to zero. The control component can control the switching component so as to provide the output voltage at the $V_{OUT}$ node in a discontinuous conduction mode to drive the load.

18 Claims, 7 Drawing Sheets

(51) Int. Cl.
*H02M 3/158* (2006.01)
*H02M 1/15* (2006.01)

(56) References Cited

U.S. PATENT DOCUMENTS

| | | | | |
|---|---|---|---|---|
| 2006/0238174 A1* | 10/2006 | Russell | ............ | H05B 33/0818 323/229 |
| 2007/0040537 A1* | 2/2007 | Low | ............ | H02M 3/1588 323/282 |
| 2007/0085520 A1* | 4/2007 | Ho | ............ | H02M 3/1588 323/282 |
| 2011/0012658 A1* | 1/2011 | Hsieh | ............ | H03K 7/08 327/172 |
| 2013/0033248 A1* | 2/2013 | Granger | ............ | H02M 3/1588 323/288 |

* cited by examiner

MINIMUM ON-TIME CONTROL FOR LOW LOAD DC/DC CONVERTER

BACKGROUND

The present invention generally relates to a switching control method for DC/DC converters.

DC/DC converters are used in many applications but are especially important in portable electronic devices such as cellular phones, tablets and laptop computers which are supplied with power from batteries primarily. A DC/DC converter conventionally uses switching of a DC input voltage to produce a lower DC output voltage to drive its load, and uses a feedback loop to adjust the switching parameters in order to keep the output voltage in a region around a selected average voltage. A common conventional DC/DC converter uses a sawtooth waveform and comparator for pulse width modulation (PWM) in the feedback loop to control the average voltage by keeping the frequency of the pulses constant while adjusting the pulse width. This type of DC/DC converter however is not generally chosen for low-load converters due to poor efficiency at low loads and since other, simpler designs are available. One such simpler design approach is the Constant On-Time (COT) DC/DC converter which uses a single-shot fixed pulse width pulse generator and a variable pulse frequency to adjust the feedback loop. Another design suitable for low-load applications is the dual threshold hysteretic converter which uses comparison of the output voltage against dual reference voltage thresholds. However, both the COT type and dual threshold type DC/DC converter, while versatile for low load applications can have stability problems requiring conventional complex compensation techniques.

Using the conventional low load COT-type DC/DC converter as an example, operation and stability is discussed below.

FIG. 1 illustrates a DC/DC converter 100 which is a conventional Constant On-Time (COT) hysteretic low load DC/DC converter using one-shot pulse generation.

As shown in the figure, DC/DC converter 100 includes a filter 101, a ground plane 106, a $V_{OUT}$ node 108, a load 110, a resistor ladder 112, an adder 114, an adder input 116, an Emulated Ripple Generator (ERG) 120, a hysteretic comparator 122, a reference voltage 126, a one-shot pulse generator/driver 130, a switch 132, a $V_{IN}$ node 134 and a diode 136. Filter 101 includes an inductor 102 and a capacitor 104. Hysteretic comparator 122 has a comparator input 124 and a comparator input 128.

Inductor 102 is arranged between switch 132 and capacitor 104. Capacitor 104 is arranged to connect between ground plane 106 and inductor 102. Load 110 is arranged to connect between capacitor 104 and ground plane 106. $V_{OUT}$ node 108 is arranged to be the shared connection of inductor 102, capacitor 104, load 110 and resistor ladder 112. Switch 132 is arranged between $V_{IN}$ node 134 and the shared connection of diode 136 and inductor 102. Diode 136 is arranged between switch 132 and ground plane 106. Output ripple voltage 116 is arranged to be the shared connection of resistor ladder 112 and adder 114. ERG 120 is arranged to connect to adder 114. An emulated ripple voltage 118 is arranged to be the shared connection of ERG 120 and adder 114. Adder 114 is arranged to connect to hysteretic comparator 122 at comparator input 124. Reference voltage 126 is arranged to connect to hysteretic comparator 122 at comparator input 128. Hysteretic comparator 122 is arranged to connect to one-shot pulse generator/driver 130. One shot pulse generator/driver 130 is arranged to connect to switch 132.

$V_{IN}$ node 134 receives input voltage $V_{IN}$ and provides current through inductor 102 to charge capacitor 104, when switch 132 is on. Capacitor 104 charges through inductor 102 to provide output voltage 108 and output current through load 110. Diode 136 prevents discharge of capacitor 104 through inductor 102. Resistor ladder 112 provides ripple voltage 116, a derivation of an output voltage, $V_{OUT}$, at $V_{OUT}$ node 108, to comparator 122 via adder 114. ERG 120 provides emulated ripple voltage 118. Adder 114 adds ripple voltage 116 and emulated ripple voltage 118 and provides the sum to hysteretic comparator 122 at comparator input 124. Reference voltage source 126 provides a reference voltage for comparison by hysteretic comparator 122 at comparator input 128. Reference voltage 126 sets the average output voltage of DC/DC converter 100. Hysteretic comparator 122 provides, with some finite hysteresis, an output to one-shot pulse generator/driver which is generally low when the voltage at comparator input 124 is greater than the voltage at comparator input 128 and high when the voltage at comparator input 124 is less or equal to the voltage at comparator input 128. One-shot pulse generator/driver produces a pulse of fixed duration whenever hysteretic comparator 122 goes high. One-shot pulse generator/driver also drives switch 132 ON during the pulse and OFF when the pulse is absent.

In operation, the DC/DC converter converts $V_{IN}$ to a lower $V_{OUT}$, driving a load $R_L$. This will be described with additional reference to FIG. 2.

FIG. 2 illustrates the timing diagram 200 showing the behavior of various parameters of DC/DC converter 100 over time.

As shown in the figure, timing diagram 200 includes a switch waveform 202, an X-axis 204, a Y-axis 206, a time $t_1$ illustrated by dotted line 208, a time $t_2$ illustrated by dotted line 210, a time $t_3$ illustrated by dotted line 212, a current waveform 214, an X-axis 216, a Y-axis 218, a voltage waveform 220, an X-axis 222, and a Y-axis 224.

X-axis 204, X-axis 216 and X-axis 222 represent time. Referring also to FIG. 1, Y-axis 206 represents the voltage at the output of switch 132. Y-axis 218 represents the current through inductor 102 and Y-axis 224 represents $V_{OUT}$ at $V_{OUT}$ node 108.

The case where emulated ripple voltage 118 is zero will be initially considered starting with condition where switch 132 has just turned on.

Switch 132 has been turned on by the pulse from one-shot pulse generator/driver 130. Waveform 202 of FIG. 2 shows this at time $t_1$, (dotted line 208). This allows $V_{IN}$ to charge capacitor 104 through inductor 102 and $i_L$ rises (waveform 214) as does $V_{OUT}$ (waveform 220).

After the fixed ON-time, $t_{ON}$, (see waveform 202) the pulse generated by pulse generator/driver 130 expires at time $t_2$ (dotted line 210) and switch 132 goes off. With switch 132 off, waveform 214 shows that current through inductor 102 ramps down as capacitor 104 discharges through load 110. Note that diode 136 prevents discharge of the capacitor through inductor 102. As capacitor 104 discharges, $V_{OUT}$ also falls as shown by waveform 220.

After some time, $V_{OUT}$ falls sufficiently that voltage ripple 116 falls below the value of $V_{REF}$ at comparator input 128 and comparator 122 changes states, triggering a pulse from one shot pulse generator/driver 130. This is now the start of a new cycle.

$V_{OUT}$ at $V_{OUT}$ node 108 appears as voltage ripple $V_{RIPPLE}$ at load 110 about a nominal DC voltage $V_{DC}$.

The behavior described above illustrates that output voltage regulation of a COT DC/DC converter with zero emulated ripple is achieved by comparing $V_{OUT}$ to $V_{REF}$. Under certain conditions and without additional circuitry, COT DC/DC converters can enter states where they become unstable such that a consistent output from cycle to cycle within the desired voltage range cannot be maintained.

In addition, $V_{RIPPLE}$ must be large enough to overcome the comparator hysteresis in order for the comparator to change states. Accordingly, since the output ripple is directly proportional to the ESR of the output capacitor, it follows that the ESR must also be large enough for $V_{RIPPLE}$ to toggle the comparator properly and consistently. Ceramic capacitors have significant advantages in cost, reliability, stability, and circuit space over bulk electrolytic capacitors and as such it is very desirable to use them in low load DC/DC converters. However, when used in such circuits as described above, the very low ESR of ceramic capacitors and resulting low ripple levels in circuits such as those described above can cause the switching and therefore the operation of the converter to become unstable.

A conventional remedy for the instabilities discussed above is to inject a controlled amount of additional ripple at the comparator input using an emulated ripple generator. The ERG ripple is controlled so that the regulation is predictable over all cycles. Referring to FIG. 1, ERG 120 provides this additional ripple, introducing it to the comparator via adder 114. Use of an ERG, however introduces additional DC error at the converter output and so further measures, conventionally high gain amplifiers, are needed to reduce these.

A conventional COT DC/DC convener described above can operate in Continuous Conduction Mode (CCM), a mode whereby the current through the inductor is always positive. A system operating in CCM is a second-order system, that is, the transfer function describing the system is a second order function. A converter can also be designed to operate in Discontinuous Conduction mode (DCM) characterized by the inductor current falling to zero for a period of time. A converter operating in DCM is a first order system, which is an inherently more stable system.

CCM and DCM operation can also be illustrated with a diagram.

FIG. 3 shows timing diagram 300 which illustrates the modes of operation CCM and DCM.

Timing diagram 300 shows the switching and inductor current waveforms from timing diagram 200 which represent CCM operation, but adds an additional inductor current waveform to illustrate DCM operation.

As shown in the figure, timing diagram 300 includes switch waveform 202, X-axis 204, Y-axis 206, time $t_1$ illustrated by dotted line 208, time $t_2$ illustrated by dotted line 210, time $t_3$ illustrated by dotted line 212, current waveform 214, X-axis 216, Y-axis 218, a current waveform 302, an X-axis 304, and a Y-axis 306.

X-axis 204, X-axis 216 and X-axis 304 represent time. Referring also to FIG. 1, Y-axis 206 represents the voltage at the output of switch 132 and Y-axis 218 represents the current through inductor 102 for the CCM case. Y-axis 306 represents the current through inductor 102 for the CCM/DCM case.

The operation of DC/DC converter 100 has been explained previously and is not covered again in this description.

In the figure, current waveform 214 shows the behavior over time of the current through inductor 102, $i_L$. Current waveform 214 shows $i_L$ for the case where the load is sufficiently high to ensure that operation stays in CCM. This is indicated, by $i_L$ staying above zero for current waveform 214.

Current waveform 302 shows $i_L$ for the case where the load is sufficiently reduced such that operation enters DCM for a portion of the cycle. This is indicated in current waveform 302 by the portions of the cycle for which $i_L$ has reached zero. As explained previously, a converter operating in DCM is an inherently more stable system.

Stabilization compensation techniques, such as ERG as described above and used for conventional converters such as COT converters operating in CCM, can substantially increase the design complexity of low load DC/DC converter design. This added complexity can significantly impact design time, circuit area, gate count and therefore cost and size, two qualities which are essential for portable electronics production.

What is needed is a simpler low load DC/DC converter design that mitigates the stability issues described above but that does not require the additional circuitry needed to implement conventional stabilization techniques such as ERG or the additional circuitry then needed to reduce the DC errors caused by the stabilization technique.

BRIEF SUMMARY

The present invention provides a system and methods for the implementation of a low load DC/DC converter that does not require the additional circuitry necessary for a conventional stabilization technique such as emulated ripple generation to ensure stability of the implementation or the additional circuitry then needed to reduce DC errors caused by the stabilization technique. The present invention also provides significant improvements in ripple levels at low loads.

Aspects of the present invention provide a DC/DC converter for use with a supply voltage and operable to drive a load, wherein the DC/DC converter includes a $V_{IN}$ node, a $V_{OUT}$ node, a switching component, a filter, a comparator, a current detecting component and a control component. The $V_{IN}$ node can receive the supply voltage and the $V_{OUT}$ node can provide an output voltage to drive the load. The filter electrically connects the switching component with the $V_{OUT}$ node. The comparator can generate a comparison signal based on the output voltage. The current detecting component can detect when a current in a direction from the filter toward the $V_{OUT}$ node decreases to a predetermined threshold. The control component can control the switching component, based on the comparison signal transitioning polarity and based on the current detecting component detecting when the current in the direction from the filter toward the $V_{OUT}$ node decreases to the predetermined threshold, so as to provide the output voltage at the $V_{OUT}$ node in a discontinuous conduction mode to drive the load.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
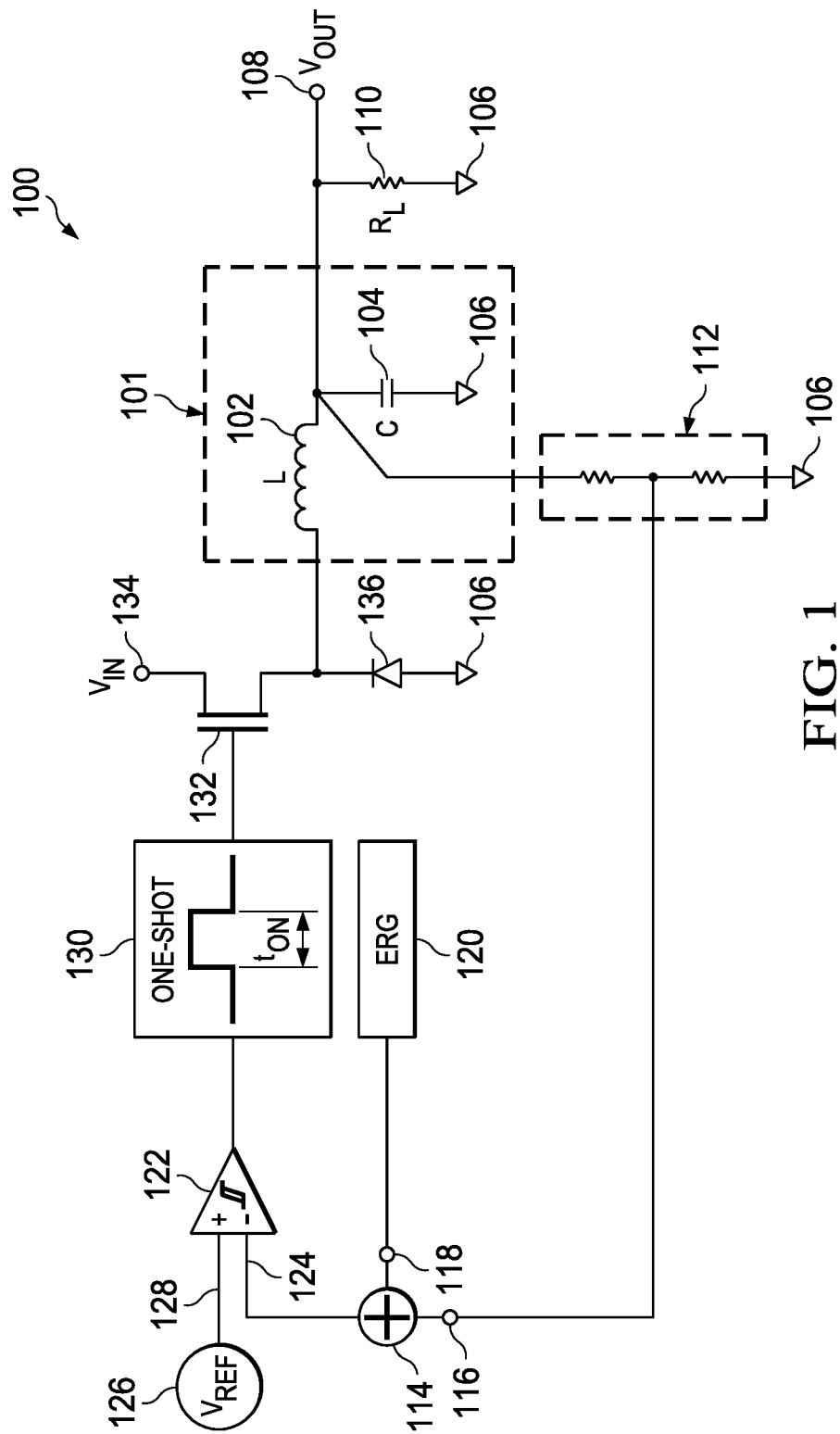
FIG. 1 shows a conventional Constant On-Time (COT) hysteretic low load DC/DC converter.
Figure 2:
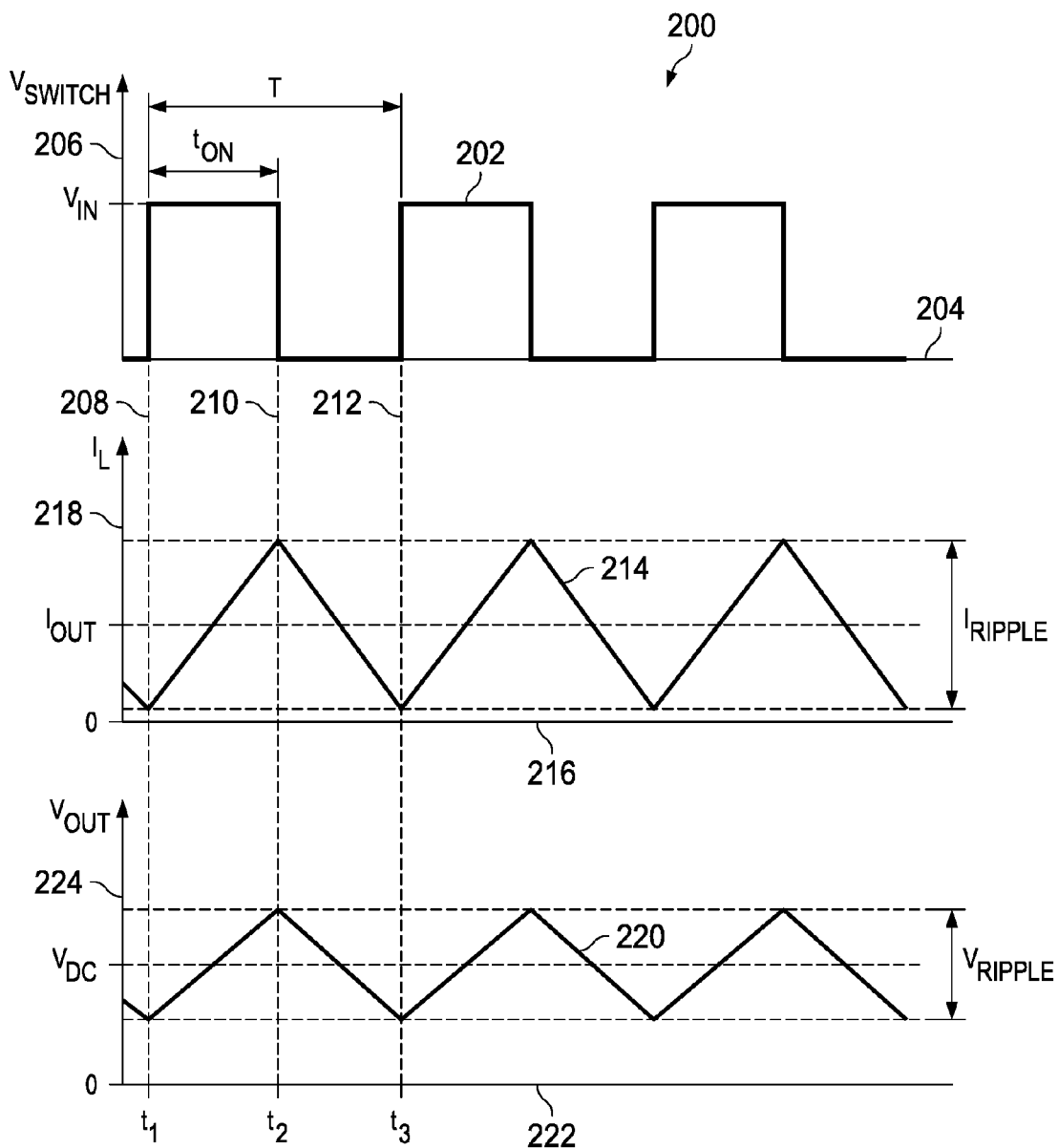
FIG. 2 illustrates the timing of a conventional Constant On-Time (COT) hysteretic low load DC/DC converter.
Figure 3:
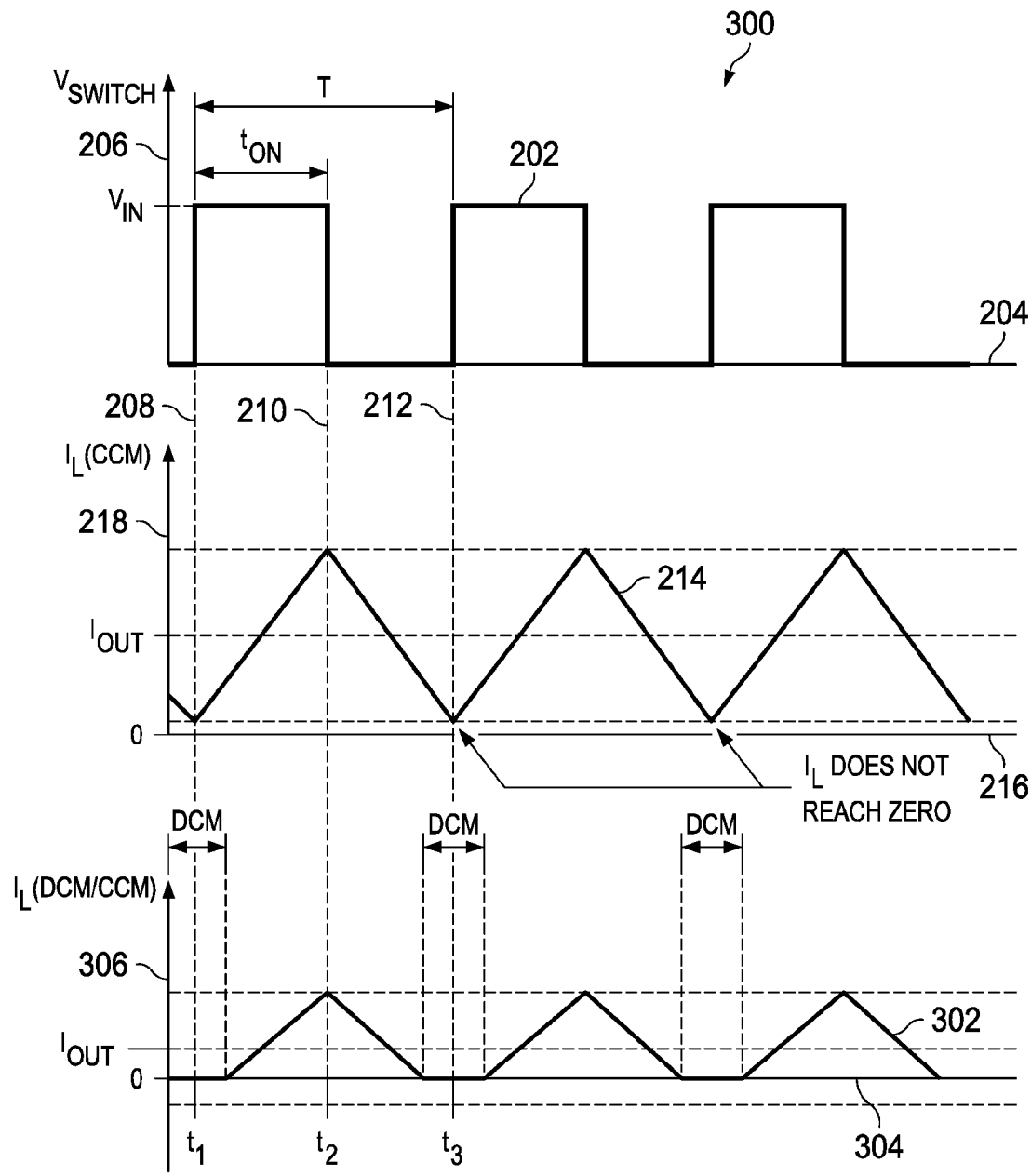
FIG. 3 illustrates the modes of operation CCM and DCM.

Aspects of the present invention are drawn to a DC/DC converter for use with a supply voltage, and that may drive a load.

A first aspect of the present invention is drawn to the use of both leading and trailing edges of an output of a comparator to cause the switching and selection of filter charge and discharge paths for the regulation of the output voltage. Both edges of the comparator are used in a way that imposes a fixed relationship between inductor current and load current in order to ensure scalability of load and output ripple as load decreases. This scalability is a great improvement over conventional low-load DC/DC converters where the output ripple stays high as the load decreases.

A second aspect of the present invention is drawn to the use of a reverse current detector to determine the point in the regulation cycle to cause the switching and selection of filter charge and discharge paths to force the low-load DC/DC converter operation into Discontinuous Conduction Mode (DCM) for part of the switching cycle. Forcing DCM operation converts the transfer function of the system from a less stable second order system into a more stable first order system. DCM operation for part of the cycle is sufficient to ensure stability such that the additional complex circuitry needed to implement stability compensation in a conventional second order system can be eliminated.

A third aspect of the present invention is drawn to the use of a one-shot pulse generator to ensure a Minimum ON-Time (MOT) for the switch used to enable charging current to charge the filter capacitor through the inductor. MOT is used to ensure a minimum on-time and a minimum value for inductor current, which is needed for continued operation of the converter at very low loads. MOT operation in conjunction with other aspects of the invention gives a significant ripple advantage over conventional systems at very low loads.

As discussed previously, conventional DC/DC converters used in low load applications can be subject to stability problems. Under certain conditions and without additional complex circuitry, conventional DC/DC converters can enter unstable states in which a consistent output from cycle to cycle within the desired voltage range cannot always be maintained. Furthermore, the use of low ESR capacitors presents additional instability problems when output ripple can become too low to maintain proper switching of comparator states. The aspects of the present invention stated above eliminate these stability problems without resorting to conventional complex, costly techniques such as ERG circuits and high gain amplifiers.

Using both the leading and trailing edges of an output of a comparator for voltage regulation, in addition to the use of a reverse current detector as discussed above ensures that a DC/DC converter will always enter into DCM operation once per cycle thus resetting the operation to a known state each cycle and achieving the cycle to cycle operational consistency needed for stable operation. With conventional DC/DC converters, output ripple can increase as load decreases. Using both the leading and trailing edges of an output of a comparator for voltage regulation as discussed above ensures that output ripple for a DC/DC converter in accordance with these aspects will not increase with decreasing load, a significant advantage over the prior art. Given the current scaling and comparatively low ripple levels maintained through use of the first two aspects, the MOT avoids problems at very low ripple levels by setting a minimum ON-time for the circuit design.

Aspects of the present invention will now be described in greater detail with reference to FIGS. 4-7.

Figure 4:
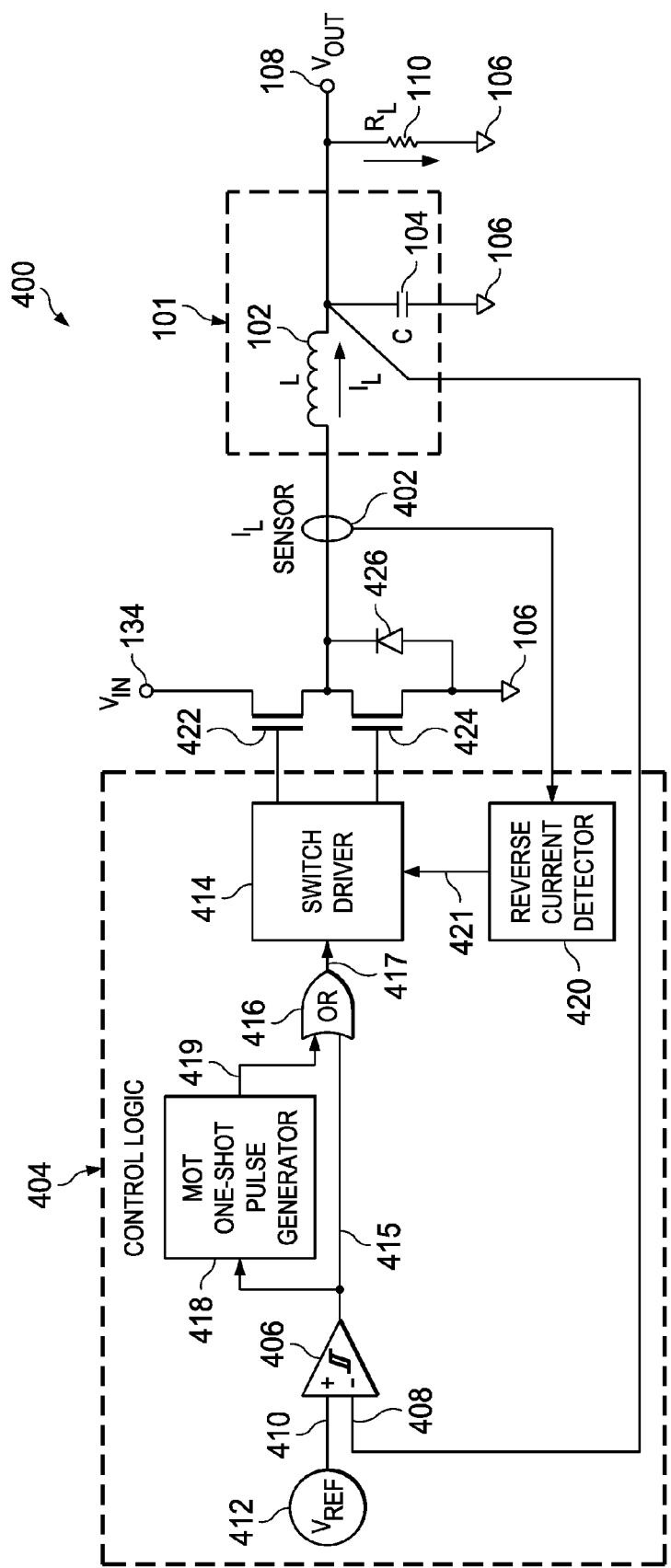
FIG. 4 shows a low-load DC/DC converter operating in accordance with aspects of the present invention.

FIG. 4 shows DC/DC converter 400, is a low-load DC/DC converter in accordance with aspects of the present invention.

As shown in the figure, DC/DC converter 400 includes filter 101, ground plane 106, load 110, a current sensor 402, a control component 404, a switching component and a diode 426. The switching component includes a high-side switch 422 and a low-side switch 424. Control component 404 includes a comparator 406, a reference voltage source 412, a switch driver 414, an OR gate 416, a pulse generator 418 and a reverse current detector 420. Filter 101 includes inductor 102 and capacitor 104. Comparator 406 has a comparator input 408 and a comparator input 410. DC/DC converter 400 has $V_{OUT}$ node 108.

$V_{IN}$ at node 134 is applied to high-side switch 422. Inductor 102 is arranged between high-side switch 422 and $V_{OUT}$ node 108. Capacitor 104 is arranged between ground plane 106 and the shared connection of inductor 102 and $V_{OUT}$ node 108. Load 110 is arranged between $V_{OUT}$ node 108 and ground plane 106. Diode 426 is arranged to connect between ground plane 106 and the shared connection of high-side switch 422 and low-side switch 424. The shared junction connecting inductor 102, capacitor 104 and $V_{OUT}$ node 108 is arranged to connect to comparator input 408. Reference voltage source 412 is arranged to connect to comparator input 410. Comparator 406 is connected to one input of OR gate 416. Pulse generator 418 is connected between comparator 406 and another input of OR gate 416. Switch driver 414 is connected to the output of OR gate 416 and provides output signals to high-side switch 422 and low-side switch 424. Current sensor 402 is arranged at the high-side switch side of inductor 102. Reverse current detector 420 is arranged between current sensor 402 and switch driver 414.

$V_{IN}$ node 134 provides current through inductor 102 to charge capacitor 104, when high-side switch 422 is on. Capacitor 104 charges through inductor 102 and to provide $V_{OUT}$ to $V_{OUT}$ node 108 and provide current through load 110. Diode 426 prevents discharge of capacitor 104 through inductor 102. Reference voltage source 412 provides the input needed to set the desired average output voltage for DC/DC converter 400. Comparator 406 compares voltages at input 408 and input 410 and produces an output on lead

415. Pulse generator 418 outputs a single shot pulse when triggered by comparator 406. OR-gate 416 provides a logical OR function of output signals from comparator 406 and pulse generator 418 to switch driver 414. Switch driver 414 drives high-side switch 422 and low-side switch 424. Current sensor 402 provides a voltage proportional to the current passing through inductor 102 to reverse current detector 420.

In accordance with an aspect of the present invention, a current detecting component detects when $i_L$ decreases to a predetermined current threshold, as will be discussed in more detail below. In some embodiments, the predetermined current threshold is zero. In an example embodiment, current sensor 402 and reverse current detector 420 may be considered as the current detecting component. Reverse current detector 420 controls switch driver 414.

Comparator 406 generates a comparison signal 415 based on $V_{OUT}$. In particular, comparator 406 generates comparison signal based on the difference between $V_{OUT}$ and a predetermined voltage threshold, $V_{REF}$, provided by reference voltage source 412. Comparator 406 changes state when $V_{OUT}$ is greater than or equal to $V_{REF}$ and changes state again when $V_{OUT}$ is less than $V_{REF}$. For purposes of discussion, in this non-limiting example embodiment, comparator 406 will go high when $V_{OUT}$ is less than $V_{REF}$ and will go low when $V_{OUT}$ is equal to or greater than $V_{REF}$.

A MOT comparator, for example comparator 406, may generate a MOT signal, for example comparison signal 415, based on the difference between a detected parameter, for example the detected voltage at comparator input 408, and a predetermined MOT threshold, for example the voltage provided by voltage source 412. When the high-side switch, for example high-side switch 422, is closed, a control component, for example switch driver 414, may keep the high-side switch closed until the later of receiving a MOT signal, for example a MOT signal 417, and after the difference (between the detected parameter and the predetermined MOT threshold) transitions from one polarity to another, for example as provided by a control signal 421.

Control component 404 controls switching component 422, 424, as will be discussed in more detail below. The control may be based on $V_{OUT}$ and $i_L$. In an example embodiment, the control may be based on the polarity transitioning of comparison signal 415 and based on current sensor 402 detecting when $i_L$ in the direction from filter 101 toward $V_{OUT}$ node 108 decreases to a predetermined current threshold, so as to provide $V_{OUT}$ at $V_{OUT}$ node 108 in a discontinuous conduction mode to drive load 110. In an example embodiment, the predetermined current threshold is zero.

Switch driver 414 drives high-side switch 422 on and low-side switch 424 off when either comparator 406 output 415 has gone high or the pulse from pulse generator 418 is high, as will be discussed in more detail below. Further, switch driver 414 drives high-side switch 422 off and low-side switch 424 on when the later of: comparator 406 output 415 goes low; or the pulse from pulse generator 418 goes low, as will be discussed in more detail below.

Pulse generator 418 establishes a predetermined MOT by way of a MOT signal 419, as will be discussed in more detail below. MOT signal 419 is based on a difference between a detected parameter and a predetermined MOT threshold. In an example embodiment, the detected parameter is comparison signal 415, which is based on $V_{REF}$ provided by reference voltage source 412 and $V_{OUT}$. Pulse generator 418 provides a single pulse when comparator 406 goes high. The width of the pulse provided by pulse generator 418 is set by the design of control component 404.

OR-gate 416 is a non-limiting example of a MOT comparator, which will establish a minimum on time to ensure that DC/DC converter 400 will consistently output a voltage each cycle, as will be discussed in more detail below. The output 419 of OR-gate 416 may therefore be called MOT signal 417. MOT signal 417 is therefore based on MOT signal 419 and comparison signal 415.

Reverse current detector 420 controls switch driver 414, via control signal 421, to switch low-side switch 424 off. Reverse current detector 420 ensures that DC/DC converter 400 will consistently output a zero current at some point within each cycle thus operating in a DCM, as will be discussed in more detail below. In an example embodiment, this will occur when current sensor 402 indicates that the current, $i_L$, through inductor 102 has reached zero and has started to go negative.

In operation, DC/DC converter 400 converts $V_{IN}$ to a lower $V_{OUT}$, driving a load $R_L$. This will be further described with additional reference to FIG. 5.

Figure 5:
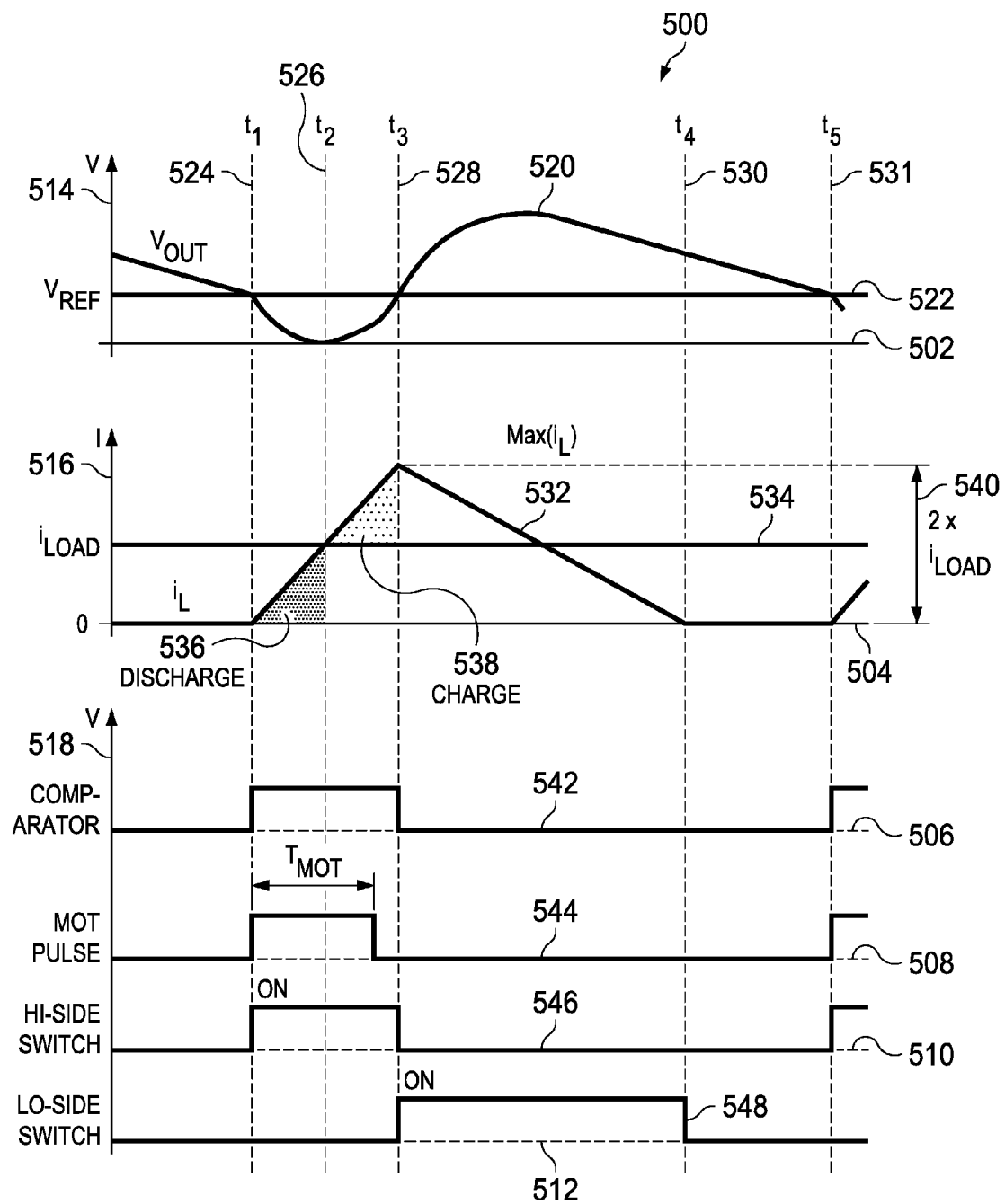
FIG. 5 illustrates the timing of a low-load DC/DC converter operating in accordance with aspects of the present invention for which the minimum ON-time has been exceeded.

FIG. 5 shows timing diagram 500 to illustrates the behavior over time of DC/DC converter 400.

As shown in the figure, timing diagram 500 includes an X-axis 502, an X-axis 504, an X-axis 506, an X-axis 508, an X-axis 510, an X-axis 512, a Y-axis 514, a Y-axis 516, a Y-axis 518, a trace 520, a $V_{REF}$ line 522, a time $t_2$ illustrated by dotted line 524, a time $t_2$ illustrated by dotted line 526, a time $t_3$ illustrated by dotted line 528, a time $t_4$ illustrated by dotted line 530, a time $t_5$ illustrated by dotted line 531, a trace 532, an $i_{LOAD}$ line 534, a discharge region 536, a charge region 538, an $i_{LMAX}$ level 540, a trace 542, a trace 544, a trace 546 and a trace 548.

In the figure, X-axis 502, X-axis 504, X-axis 506, X-axis 508, X-axis 510 and X-axis 512 represent time. Y-axis 514 represents voltage, Y-axis 516 represents current and Y-axis 518 represents voltage. $V_{REF}$ line 522 represents reference voltage $V_{REF}$ over time and $i_{LOAD}$ line 534 represents load current $i_{LOAD}$ over time. Trace 520 shows the behavior over time of $V_{OUT}$, trace 532 shows the behavior over time of $i_L$, trace 542 shows the behavior over time of comparator 406 of FIG. 4, trace 544 shows the behavior over time of pulse generator 418, trace 546 shows the behavior over time of high-side switch 422 and trace 548 shows the behavior over time of low-side switch 426.

Beginning at a point in the switching cycle where capacitor 104 is charged, $V_{OUT}$ is greater than $V_{REF}$, comparator 406 is high, there is no pulse from pulse generator 418, both high-side switch 422 and low-side switch 424 are off and the current through inductor 102 is zero, $V_{OUT}$ is falling (see trace 520) as capacitor 104 discharges through load 110. Diode 426 is preventing discharge through inductor 102. This point is just prior to time $t_1$ (524).

As the cycle continues, $V_{OUT}$ eventually falls below $V_{REF}$ at time $t_1$ causing comparator 406 to toggle high (trace 542) thus controlling switch driver 414 to turn high-side switch 422 on (trace 546). A pulse from pulse generator 418 has also been triggered as shown by trace 544. With high-side switch 422 turned on, $V_{IN}$ is connected to inductor 102 and $i_L$ rises (see trace 532). $V_{OUT}$ is still falling at this point as capacitor 104 continues to discharge (trace 520). However, at time $t_2$ when $i_L$ has risen to the point that it equals the current through load 110, $i_{LOAD}$, capacitor 104 starts charging and $V_{OUT}$ starts rising again. As the cycle continues, capacitor 104 continues to charge.

For the case that the pulse from pulse generator 418 has ended prior to $t_3$, which is the case illustrated in FIG. 5, pulse generator 418 no longer sets the output state of OR gate 416 and $V_{OUT}$ eventually reaches $V_{REF}$. Comparator 406 then changes to a low state at $t_3$ (see trace 542) thus controlling switch driver 414 to turn high-side switch 422 off and turn low-side switch 424 on as shown by traces 546 and 548, respectively.

For the case that the pulse from pulse generator 418 has not ended prior to $t_3$, $V_{OUT}$ reaching $V_{REF}$ and comparator 406 toggling low would have no effect on switch driver 414 due to pulse generator 418 holding one input of OR gate 416 high. Instead, the end of the pulse from pulse generator 418 controls switch driver 414 to turn off high-side switch 422 off and turn on low-side switch 424. This ensures that high-side switch 422 always has a minimum ON time equal to the pulse width set at pulse generator 418. This case is not illustrated in FIG. 5 but it is discussed later using FIG. 7.

Referring again to the case illustrated by FIG. 5, it is important to note that the discharge region 536 between time $t_1$ and time $t_2$, which represents the energy lost by capacitor 104 has the same area as charge region 538 which represents the energy gained by capacitor 104 from time $t_2$ to time $t_3$. Capacitor discharge starts at $t_1$ when $V_{OUT}=V_{REF}$, so at the point ($t_3$) where charge (538) equals the discharge (536), $V_{OUT}$ again is equal to $V_{REF}$ and comparator 406 triggers causing high-side switch 422 to turn off. From this it follows that the maximum current reached by $i_L$, for any load, is equal to twice $i_{LOAD}$ (540), that is, $i_{LMAX}=2\times i_{LOAD}$.

With high-side switch 422 now off and low-side switch 424 now on at time $t_3$, $i_L$ starts to fall (see trace 532). The stored energy in inductor 102 causes $V_{OUT}$ to continue to rise (trace 520) until $i_L$ decreases to $i_{LOAD}$. At this point, capacitor 104 starts to discharge through load 110 and $V_{OUT}$ now starts falling. During this part of the cycle, switch driver 414 prevents any further switching of high-side switch 422 and low-side switch 424 while waiting for a control signal from reverse current detector 420.

At time $t_4$, $i_L$ falls to zero, and since there is a probability that $i_L$ may go negative (which is an undesirable condition for correct operation of the system), reverse current detector 420 causes switch driver 414 to switch low-side switch 424 off and diode 426 then prevents the negative $i_L$ condition. At time $t_5$, $V_{OUT}$ has fallen to $V_{REF}$ (trace 520) which is the condition for comparator 406 to change states and switch high-side switch 422 on again signifying the beginning of the next cycle.

So, by limiting $i_{LMAX}$ to $2\times i_{LOAD}$ and by preventing a new cycle from starting until at least the reverse current detector has triggered, it is assured that DC/DC converter 400 is in DCM for a period of time, a condition essential for stability of the system. Note that from timing diagram 500, the DCM condition is for the duration $t_4$ to $t_5$.

Referring back briefly to FIG. 1 for DC/DC converter 100, which is a conventional Constant On-Time (COT) converter, the peak current through inductor 102, $i_{peak}$, is fixed for any load since the ON-time of switch 132 is fixed, from:

$$i_{peak}=V_{IN}-V_{OUT}/L\times t_{ON},$$

wherein $t_{ON}$ is a fixed ON time, and L is the inductance of inductor 102. Even at low loads, ripple current into capacitor 104 equals $i_{peak}$ when switch 132 is on. As load reduces, therefore, $i_{peak}$ stays the same, so ripple voltage increases. This results in large ripple at low loads. However, referring again to FIG. 4, the present invention operates as described previously to limit the peak current, in this case $i_{LMAX}$, to $2\times i_{LOAD}$, so as the load is reduced the ON-time of switch 422 is reduced and $i_{LMAX}$ reduces accordingly. Given this operation, ripple voltage does not increase but stays close to the same value. This results in a distinct ripple advantage for the present invention over conventional low-load DC/DC converters The scaled reduction of ON-time and peak current can be illustrated with a timing diagram.

Figure 6:
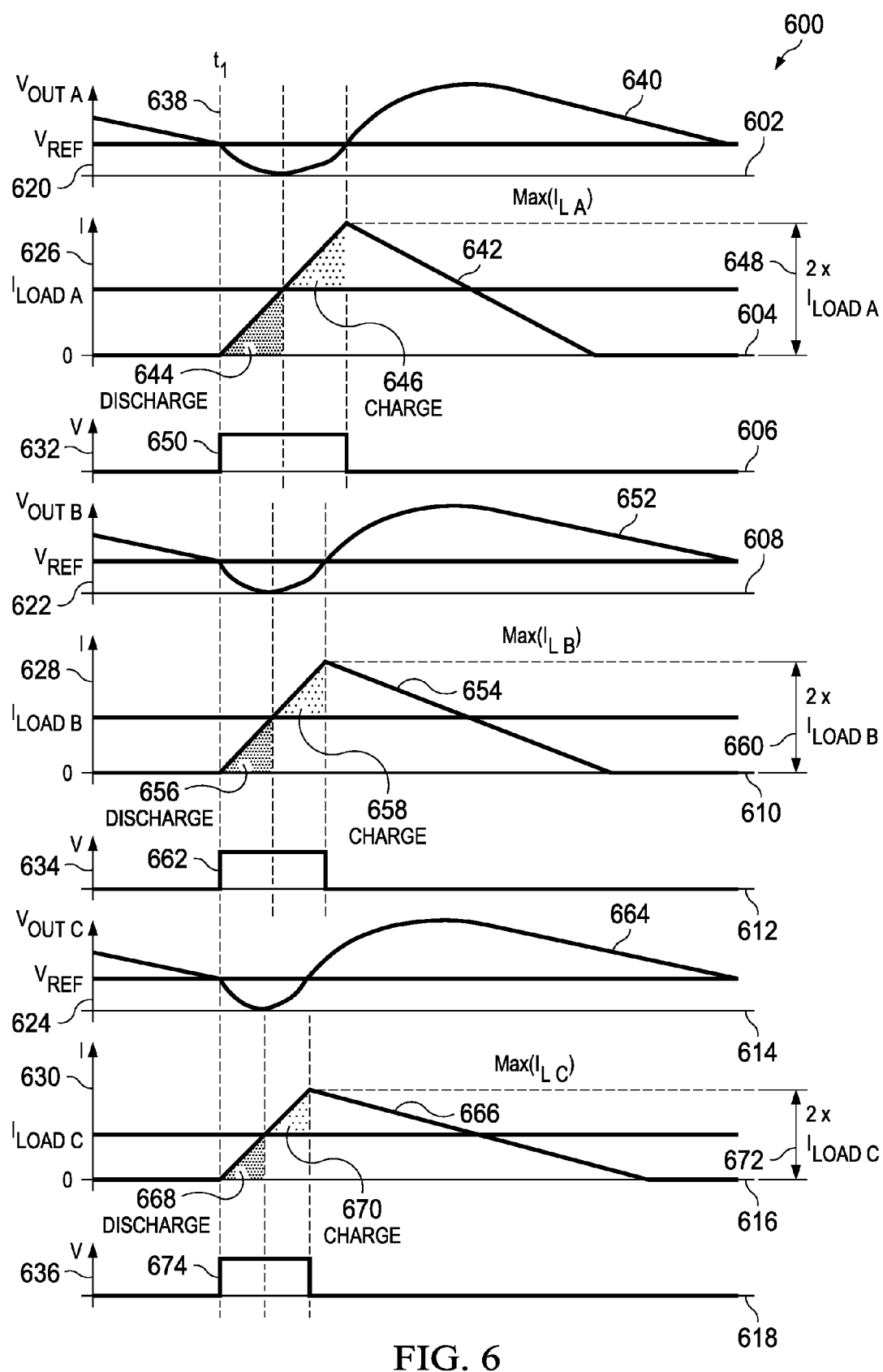
FIG. 6 illustrates the behavior of ON-time and $i_{LMAX}$ with reducing load for a DC/DC converter operating in accordance with aspects of the present invention.

FIG. 6 is a timing diagram 600 illustrating the behavior of ON-time and $i_{LMAX}$ for DC/DC converter 400 of FIG. 4 with a reducing load.

As shown in the figure, timing diagram 600 includes an X-axis 602, an X-axis 604, an X-axis 606, an X-axis 608, an X-axis 610, an X-axis 612, an X-axis 614, an X-axis 616, a Y-axis 620, a Y-axis 622, a Y-axis 624, a Y-axis 626, a Y-axis 628, a Y-axis 630, a Y-axis 632, a Y-axis 634, a Y-axis 636, a time $t_1$ 638, a trace 640, a trace 642, a discharge region 644, a charge region 646, an $i_{LMAX}$ level 648, a switch ON pulse 650, a trace 652, as trace 654, a discharge region 656, a charge region 658, an $i_{LMAX}$ level 660, a switch ON pulse 662, a trace 664, a trace 666, a discharge region 668, a charge region 670, an $i_{LMAX}$ level 672 and a switch ON pulse 674.

X-axis 602, X-axis 604, X-axis 606, X-axis 608, X-axis 610, X-axis 612, X-axis 614 and X-axis 616 are arranged to represent time. Y-axis 620, Y-axis 622 and Y-axis 624 are arranged to represent voltage, Y-axis 626, Y-axis 628, Y-axis 630 are arranged to represent current, Y-axis 632, Y-axis 634 and Y-axis 636 are arranged to represent voltage. For load A, trace 640 is arranged to represent behavior over time of $V_{OUT}$, trace 642 is arranged to represent behavior over time of $i_L$ and trace 650 is arranged to show the behavior over time of switch 422. For load B, trace 652 is arranged to represent behavior over time of $V_{OUT}$, trace 654 is arranged to represent behavior over time of $i_L$ and trace 662 is arranged to show the behavior over time of switch 422. For load C, trace 664 is arranged to represent behavior over time of $V_{OUT}$, trace 666 is arranged to represent behavior over time of $i_L$ and trace 674 is arranged to show the behavior over time of switch 422.

Timing diagram 600 illustrates reducing load for DC/DC converter 400 with Load B being lighter than load A and load C being lighter than load B. As shown in the figure, ON-time of switch 422 reduces with load, i.e., the width of the pulse of trace 674 is smaller than that of trace 662 which is smaller than at trace 650. Therefore, peak current $i_{LMAX}$ reduces with load since the pulse duration ensures $i_{LMAX}$ is proportional to $i_{LOAD}$ as previously discussed. So, $i_{LMAX}$ B (660) is smaller than $i_{LMAX}$ A (648) and $i_{LMAX}$ C (672) is smaller $i_{LMAX}$ B. Thus, ripple current reduces along with reductions in load and ripple voltage stays close to constant at all loads. This is true until the load reduces to the point that minimum on-time is reached.

As mentioned above, the ON-time decreases as the load decreases. At some point, which is dependent on the design parameters of the circuit, ON-time and $i_{LMAX}$ will be too small for stable operation, so at very low loads it is important to prevent reaching that point. This is achieved by setting a minimum pulse width at the MOT pulse generator, pulse generator 418 for DC/DC Converter 400, and thus a minimum ON-time.

In discussions to this point, the pulse from pulse generator 418 has expired before comparator 410 has changed to a low state, so OR gate 414 has allowed the comparator output to control switching. However, as load reduces further, eventually the comparator will change states before the MOT pulse has expired. For this low load and for lower loads, DC/DC converter 400 operates similarly to a fixed pulse width converter such as DC/DC converter 100, but with the significant advantage that although ripple voltage now starts to increase with reductions in load it does so starting from the comparatively low level achieved by the current scaling described previously.

This can be illustrated using a timing diagram.

Figure 7:
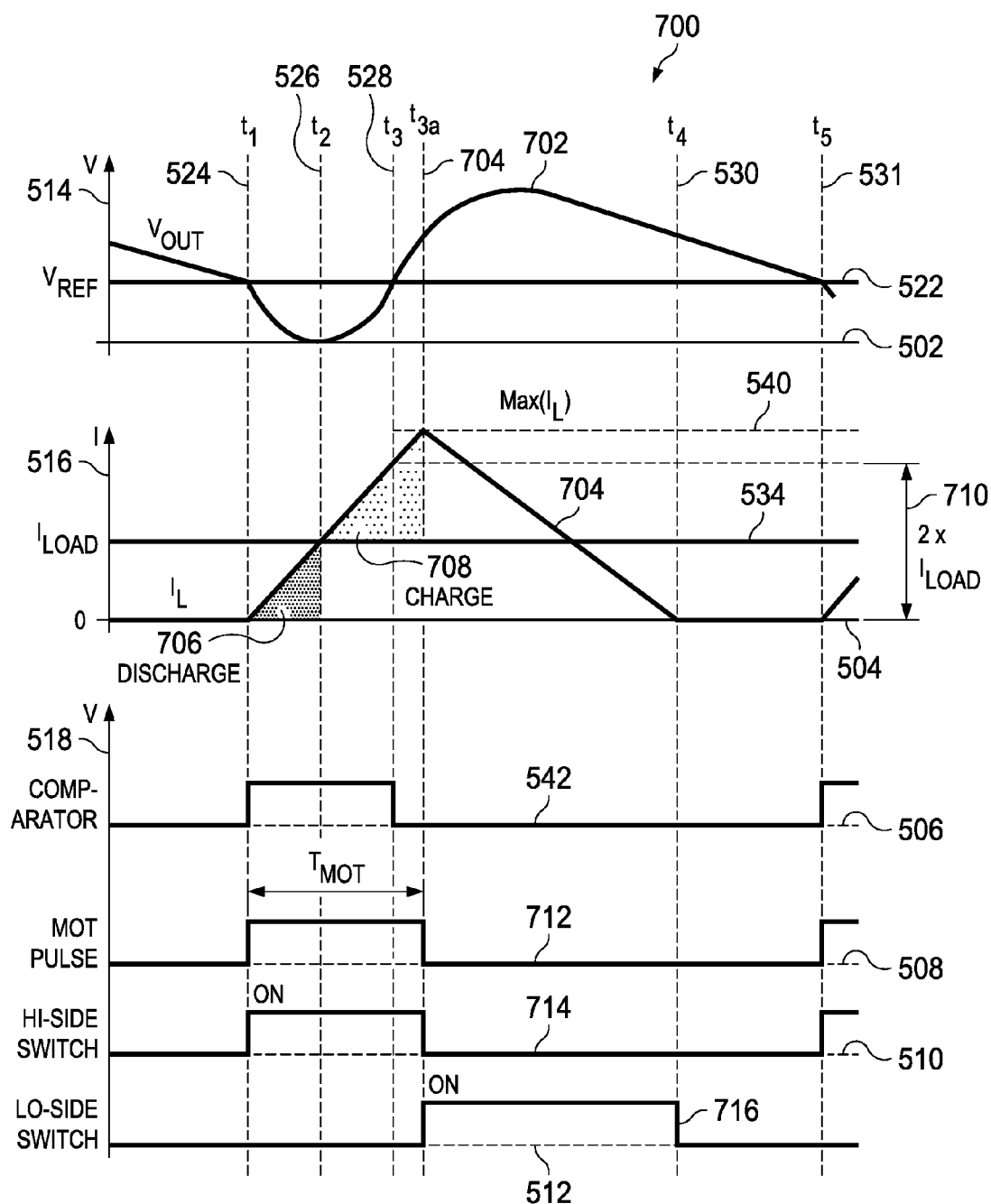
FIG. 7 illustrates the behavior over time of a DC/DC converter operating in accordance with aspects of the present invention for which the minimum ON-time has not been exceeded.

FIG. 7 shows timing diagram 700 which illustrates the behavior over time of DC/DC converter 400. Timing diagram 700 is timing diagram 500 modified for the case where the load is low enough for operation in the load region where the MOT pulse controls switching.

As shown in the figure, timing diagram 700 includes an X-axis 502, an X-axis 504, an X-axis 506, an X-axis 508, an X-axis 510, an X-axis 512, a Y-axis 514, a Y-axis 516, a Y-axis 518, a line 522, a line 524, a line 526, a line 528, a line 530, a line 531, an $i_{LOAD}$ line 534, an $i_{LMAX}$ level 540, a trace 542, a trace 702, a trace 704, a discharge region 706, a charge region 708 a trace 712, a trace 714 and a trace 716.

In the figure, X-axis 502, X-axis 504, X-axis 506, X-axis 508, X-axis 510 and X-axis 512 represent time. Y-axis 514 represents voltage, Y-axis 516 represents current and Y-axis 518 represents voltage. Line 524 represents time $t_1$, line 526 represents time $t_2$, line 528 represents time $t_3$, line 704 represents time $t_3a$, line 530 represents time $t_4$ and line 531 represents time $t_5$. Line 522 represents reference voltage $V_{REF}$ over time and line 534 represents load current $i_{LOAD}$ over time. Trace 702 shows the behavior over time of $V_{OUT}$, trace 704 shows the behavior over time of $i_L$, trace 542 shows the behavior over time of comparator 406 of FIG. 4, trace 712 shows the behavior over time of pulse generator 418, trace 714 shows the behavior over time of high-side switch 422 and trace 716 shows the behavior over time of low-side switch 424.

For timing diagram 700, comparator 406 changes to a low state at time $t_3$ (528) when a portion of charge region 708 equals discharge region 706 and $i_L=2 \times i_{LOAD}$. Comparing this to timing diagram 500 of FIG. 5, the behavior is the same up to this point. However, for timing diagram 700, since the MOT pulse width of trace 712 is now larger than the duration $t_1$ (524) to $t_3$ (528), OR-gate 416 prevents high-side switch 422 from switching off and low-side switch 424 from switching on until the MOT pulse of trace 712 expires at $t_3a$ (704). Therefore the ON-time for the system is now the fixed MOT value, rather than the value controlled by comparator 406 which is variable with load. It can also be seen from the figure that charge region 708 is larger than discharge region 706 and $i_{LMAX}$ is now greater than $2 \times i_{LOAD}$. For any particular design, as stated above, it is important to have a settable minimum ON-time under very low load conditions. In some embodiments, this may be achieved by setting the pulse width of the MOT pulse generator.

As previously discussed, several types of conventional DC/DC converters designs exist which are targeted for low load, low capacitor ESR applications including PWM, COT and dual threshold hysteretic types. However, these exhibit issues with high output ripple with decreasing load as well as inherent instability problems that manifest as cycle to cycle output inconsistencies or missed cycles. To mitigate these issues, conventional DC/DC converters require complex circuits such as emulated ripple generators and high power amplifiers. The added complexity of these circuits can significantly impact design time, circuit area, gate count and therefore cost and size, properties which are very important in portable electronic applications.

A DC/DC converter operating in accordance with aspects of the present invention uses both excursions of $V_{OUT}$ crossing $V_{REF}$ to toggle the comparator which controls switching of charging voltage for the output capacitor, resulting in scaling of peak charging currents with load. This prevents ripple voltages from increasing as load decreases, significantly improving ripple performance compared with conventional low load DC/DC converter designs. Furthermore, capacitor operation in conjunction with a reverse current detector to control charge voltage switching ensures that the DC/DC converter will always enter Discontinuous Conduction Mode every cycle ensuring predictability of behavior from cycle to cycle and so eliminating the need for more complex stability compensation techniques such as ERG circuits and high power amplifiers. This results in major savings of circuit real-estate, design and implementation costs when compared with conventional solutions. Lastly, the inclusion and implementation of a MOT prevents reaching the lowest portions of the DC/DC converter's operational load range and yields significant improvement of ripple levels at these very low loads over conventional designs.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A DC/DC converter configured to operate in switching cycles, comprising:
    an input node operable to receive the supply voltage (VN);
    an output node operable to provide an output voltage (VOUT);
    a high-side switch having a first terminal coupled to the input node;
    a low-side switch having a current path coupled to a second terminal of the high-side switch;
    an inductor coupled between the high-side switch and the output node and operable to conduct a current from the high-side switch during every cycle of the DC/DC converter;
    a comparator coupled to receive a reference voltage and the output voltage and operable to generate a comparison signal;
    a one-shot generator arranged to produce a minimum on-time (MOT) pulse in response to the comparison signal;
    a switch driver operable to turn on the high-side switch in response to a first level of the comparison signal, and operable to turn off the high-side switch and turn on the low-side switch in response to one of a second level of the comparison signal and an end of the MOT pulse; and
    a current detecting circuit operable to turn off the low-side switch when the current through the inductor falls to zero during every cycle of the DC/DC converter; and
    wherein a maximum value of the current through the inductor is twice a load current produced by the DC/DC converter when a transition of the comparison signal to the second is after the end of the MOT pulse.

2. The DC/DC converter of claim 1, comprising a logic circuit coupled to receive the comparison signal and the MOT pulse and apply a logical OR signal to the switch driver.

3. The DC/DC converter of claim 1, wherein the DC/DC converter is configured to operate in a discontinuous conduction mode during every cycle.

4. The DC/DC converter of claim 1, wherein the switch driver is operable to keep the high-side switch closed until a later of termination of the MOT pulse and the second level of the comparison signal.

5. The DC/DC converter of claim 1, wherein the maximum value of the current through the inductor is greater than twice the load current produced by the DC/DC converter when a transition of the comparison signal to the second level is before the end of the MOT pulse.

6. The DC/DC converter of claim 1, comprising a capacitor coupled to the output node, wherein the inductor and the capacitor comprise a filter.

7. The DC/DC converter of claim 1, comprising a current sensor operable to produce a sensor voltage proportional to the current passing through the inductor.

8. A DC/DC converter configured to operate in switching cycles, comprising:
   an input node operable to receive the supply voltage (VIN);
   an output node operable to provide an output voltage (VOUT);
   a high-side switch having a first terminal coupled to the input node;
   a low-side switch having a current path coupled to a second terminal of the high-side switch;
   an inductor coupled between the high-side switch and the output node and operable to conduct a current from the high-side switch during every cycle of the DC/DC converter;
   a comparator coupled to receive a reference voltage and the output voltage and operable to generate a comparison signal;
   a one-shot generator arranged to produce a minimum on-time (MOT) pulse in response to the comparison signal;
   a switch driver operable to turn on the high-side switch in response to a first level of the comparison signal, and operable to turn off the high-side switch and turn on the low-side switch in response to one of a second level of the comparison signal and an end of the MOT pulse; and
   a current sensor operable to produce a sensor voltage proportional to the current passing through the inductor; and
   a current detector operable to turn off the low-side switch in response to the sensor voltage; a maximum value of the current through the inductor is twice a load current produced by the DC/DC converter when a transition of the comparison signal to the second is after the end of the MOT pulse.

9. The DC/DC converter of claim 8, comprising a logic circuit coupled to receive the comparison signal and the MOT pulse and apply a logical OR signal to the switch driver.

10. The DC/DC converter of claim 8, wherein the DC/DC converter is configured to operate in a discontinuous conduction mode during every cycle.

11. The DC/DC converter of claim 8, wherein the switch driver is operable to keep the high-side switch closed until a later of termination of the MOT pulse and the second level of the comparison signal.

12. The DC/DC converter of claim 8, wherein the maximum value of the current through the inductor is greater than twice the load current produced by the DC/DC converter when a transition of the comparison signal to the second level is before the end of the MOT pulse.

13. The DC/DC converter of claim 8, comprising a capacitor coupled to the output node, wherein the inductor and the capacitor comprise a filter.

14. The DC/DC converter of claim 8, wherein the current detector is operable to turn off the low-side switch when the current through the inductor falls to zero during every cycle of the DC/DC converter.

15. A method of operating a DC/DC converter in switching cycles, comprising:
   receiving a supply voltage (VIN);
   comparing an output voltage (Vout) of the DC/DC converter to a reference voltage to produce a comparison signal;
   turning on a high-side switch to conduct a current from the supply voltage through an inductor to a load during every cycle of the DC/DC converter in response to a first level of the comparison signal;
   generating a minimum on-time (MOT) pulse in response to the first level of the comparison signal;
   turning on a low-side switch and turning off the high-side switch in response to a later of termination of the MOT pulse and a second level of the comparison signal; and
   turning off the low-side switch when the current through the inductor is falls to zero during every cycle of the DC/DC converter; and a maximum value of the current through the inductor is twice a load current produced by the DC/DC converter when a transition of the comparison signal to the second is after the end of the MOT pulse.

16. The method of claim 15, comprising operating the DC/DC converter in a discontinuous conduction mode during every cycle.

17. The method of claim 15, comprising controlling the high-side switch and the low-side switch in response to a logical OR of the comparison signal and the MOT pulse.

18. The method of claim 15, comprising producing a voltage proportional to the current passing through the inductor to turn off the low-side switch.

* * * * *